United States Patent
Matsubara et al.

(10) Patent No.: US 6,733,546 B2
(45) Date of Patent: May 11, 2004

(54) METHOD OF PREPARING AN ANODE MATERIAL FOR LITHIUM SECONDARY BATTERY

(75) Inventors: Keiko Matsubara, Yokohama (JP); Toshiaki Tsuno, Yokohama (JP); Sang-Young Yoon, Cheonan (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 10/460,082

(22) Filed: Jun. 11, 2003

(65) Prior Publication Data

US 2003/0207177 A1 Nov. 6, 2003

Related U.S. Application Data

(62) Division of application No. 09/670,888, filed on Sep. 28, 2000, now Pat. No. 6,641,955.

(30) Foreign Application Priority Data

Sep. 28, 1999 (JP) ............................................ 11-275380

(51) Int. Cl.[7] ................................................. H01M 4/58
(52) U.S. Cl. ................. 29/623.1; 429/231.4; 429/231.8
(58) Field of Search ........................... 429/231.4, 231.8; 29/623.1

(56) References Cited

U.S. PATENT DOCUMENTS

| | | | | |
|---|---|---|---|---|
| 5,595,838 A | * | 1/1997 | Yamada et al. | 429/209 |
| 5,635,151 A | * | 6/1997 | Zhang et al. | 423/445 R |
| 6,391,495 B1 | * | 5/2002 | Choi et al. | 429/231.4 |
| 6,391,497 B1 | * | 5/2002 | Yoon et al. | 429/231.8 |
| 6,479,426 B2 | * | 11/2002 | Ryu et al. | 502/182 |
| 6,495,287 B1 | * | 12/2002 | Kolb et al. | 429/215 |
| 6,641,955 B1 | * | 11/2003 | Matsubara et al. | 429/231.4 |

FOREIGN PATENT DOCUMENTS

| | | | | |
|---|---|---|---|---|
| DE | 3935805 | * | 6/1990 | C08L/27/18 |
| EP | 561372 | * | 3/1993 | H01M/4/58 |
| JP | 40-919912 | * | 7/1997 | H01M/4/58 |

* cited by examiner

Primary Examiner—Mark Ruthkosky
(74) Attorney, Agent, or Firm—Christie, Parker & Hale, LLP

(57) ABSTRACT

The present invention provides anode material consisting of anode active material having a great charge-discharge capacity, a high charge-discharge efficiency, a flat discharge curve and good charge-discharge cycle properties, and provides the anode material for a lithium secondary battery consisting of being coated with an amorphous metal compound formed by a metal capable of alloying with lithium on at least one part of the surface of a carbon material capable of absorbing and releasing lithium ion.

7 Claims, 6 Drawing Sheets

METHOD OF PREPARING AN ANODE MATERIAL FOR LITHIUM SECONDARY BATTERY

CROSS-REFERENCE TO RELATED APPLICATION(S)

This application is a divisional of U.S. application Ser. No. 09/670,888, filed Sep. 28, 2000 now U.S. Pat. No. 6,641,955 which claims priority of application No. Hei 11-275380 filed in Japanese Industrial Property Office on Sep. 28, 1999, the content of which is incorporated hereinto by reference.

BACKGROUND OF THE INVENTION (a) Field of the Invention

This invention relates to an anode and an electrode for a lithium secondary battery, a lithium secondary battery, and a method for preparing an anode, and, more particularly, the present invention relates to the material of an anode, which is a metal compound coated on a carbon material.

(b) Description of the Related Art

With the proliferation of portable electronics devices in recent times, coupled with advancements which have enhances performance and enabled increasingly smaller sizes and weights for these devices, research is being actively pursued to improve the energy density of secondary batteries.

However, though graphite, one of the anode active materials traditionally used in secondary batteries, has a theoretical capacity of 372 mAh/g, in order to achieve higher capacity, multi-materials need to be developed which are quite different from graphite or materials which have graphite as the main component.

For some time tin compounds have been examined for use as anode active materials in place of graphites. It is common knowledge that the tin of in these tin compounds can form an alloy with lithium and has greater capacity than graphite.

But, as compared with graphite, these tin compounds have low initial charge capacity, a non-plain discharge curve, and bad charge-discharge properties. Accordingly, tin compounds are not widely used as anode active materials at the present time.

In spite of these defects, tin compounds are regarded as a promising anode active material because the tin compounds have much greater charge-discharge capacity than graphite.

SUMMARY OF THE INVENTION

It is an object of the present invention to provide an anode material capable of serving as an anode active material having an excellent charge-discharge cycle, a flat discharge curve, a high charge-discharge efficiency, and a great charge-discharge capacity.

It is another object to provide a method for preparing an anode material, an electrode and a lithium secondary battery having the anode material.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings wherein.

DETAILED DESCRIPTION OF THE PREFERRED EMBODIMENTS

Figure 1:
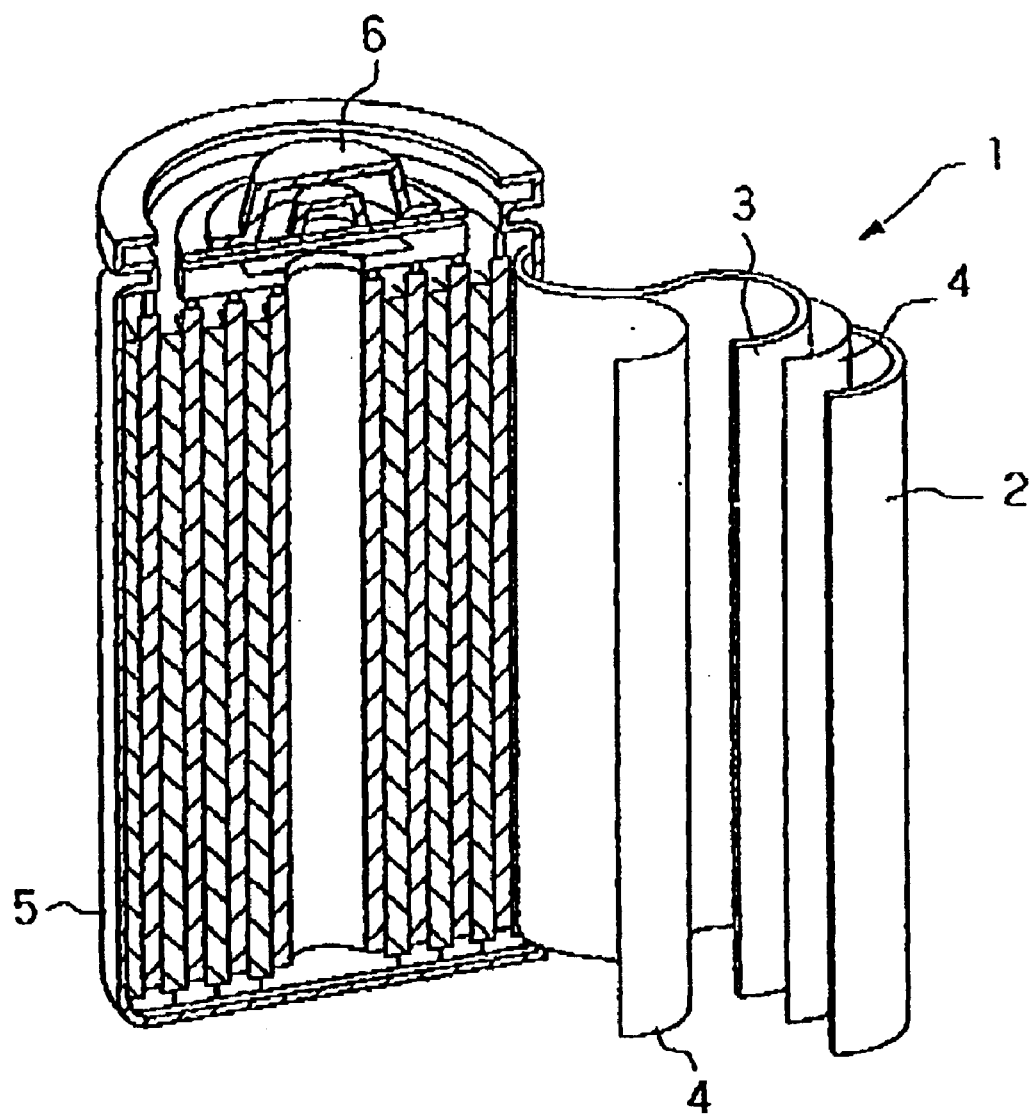
FIG. 1 is a cross-sectional drawing representing an example of a lithium secondary battery of practical form according to this invention.

In the following detailed description, only the preferred embodiment of the invention has been shown and described, by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

In order to achieve the objects of the invention, this invention consists of the following.

The anode materials for a lithium secondary battery of this invention consist of coating amorphous metal compounds formed by metals being capable of alloying with lithium on at least one part of a carbon material, which is able to absorb and release lithium ions.

Particularly, it is preferable that anode materials for the lithium secondary battery of this invention are formed by coating a thin film of the metal compounds on at least one part of a carbon material.

The anode materials for the lithium secondary battery of this invention comprise metal compounds being capable of alloying with lithium, including one or more metal(s) selected from the group consisting of Sn, Fe, Pd, Pb, Al, Si, In, Ni, Cu, Co, Zn and Cd.

More specifically, the anode materials for the lithium secondary battery of this invention may comprise metal compounds obtained by heating carboxylic metal salts.

It is preferred that the carboxylic metal salts are water-soluble carboxylic metal salts, for example, formic metal salt, acetic metal salt, and propionic metal salt.

It is further preferred that the tin acetate is thermally stable and water-soluble among them.

It is more preferred that the carboxylic metal salt is $(CH_3COO)_2Sn$ (tin acetate).

The metal compounds may be $SnO$, $SnO_2$, $Ag_2O_2$, $AgCl$, $FeO$, $FeO_2$, $PbO$, $PdO$, $Al_2O_3$, $Al(OH)_3$, $SiO$, $SiO_2$, $InO_3$, $InCl_3$, $NiO$, $NiFe_2O_4$, $NiMoO_4$, $Ni(OH)_2$, $CuO$, $CuO_2$, $CuFe_2O_4$, $CuCl$, $CoO$, $CO_3O_4$, $ZnO$, $ZnAl_2O_4$, $CdO$, $CdSnO_3$, etc.

Particularly, it is preferred that the metal compounds comprise either $SnO_2$ or $SnO$, or both of them.

Moreover, the invention is characterized in that the electrode for the lithium secondary battery of this invention includes one of the above cite anode materials for the lithium secondary battery.

Although the final electrode consists of an anode formed by combining the anode material, a conductor like graphite, and a binder in the prescribed form, and then coating the anode material with a capacitor like a copper thin film, the current invention is characterized in that the lithium secondary battery of this invention uses the above cited anode material for the lithium secondary battery.

The lithium secondary battery consists of a cathode, an electrolyte, a separator, and an anode electrode (electrode) having the anode material according to the present invention. The lithium secondary battery can come in various forms such as cylindrical type, coin type, sheet type, square type, etc.

The cathode electrode consists of a cathode active material, a conducting agent from carbon material, and a cathode material slurry formed by a binder.

For example, the cathode active material is a compound being capable of absorbing and releasing lithium, such as $NiMn_2O_4$, $LiCoO_2$, $LiNiO_2$, $LiFeO_2$, $V_2O_5$, TiS, MO, etc.

An olefinic porous film can be used as a separator, for example, such as polyethylene(PE), polypropylene(PP).

The electrolyte may be formed by mixing one or more lithium salt(s) selected from the group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ (wherein x, y are natural numbers), LiCl, LiI in one or more aprotic solvent(s) selected from the group consisting of propylenecarbonate, ethylenecarbonate, butylenecarbonate, benzonitrile, acetonitrile, tetrahydrofuran, 2-methyltetrahydrofuran, y-butyrolacton, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, dimethylcarbonate, methylethercarbonate, diethylcarbonate, methylpropylcarbonate, methylisopropylcarbonate, ethylpropylcarbonate, dipropylcarbonate, diisopropylcarbonate, dibutylcarbonate, diethyleneglycol, dimethylether, may be used.

The invention is further characterized in that the method for producing the anode material for the lithium secondary battery of this invention comprises the steps of: coating a carboxylic metal salt on the surface of a carbon material by mixing carboxylic metal salt and carbon material; transforming the carboxylic metal salt into an amorphous metal compound by heating the carbon material having the carboxylic metal salt, and forming a carbon material coated on one part by the metal compound.

Particularly, it is preferred that the carboxylic metal salt is attached to the carbon material by coating the carboxylic metal salt solution onto the carbon material and drying it, and then, heat-treating the carbon material having the carboxylic metal.

The invention also is characterized in that the carboxylic metal salt comprises one or more metal(s) selected from the group consisting of Sn, Ag, Fe, Pd, Pb, Al, Si, In, Ni, Cu, Co, Zn, Cd, being capable of alloying with lithium in the method for preparing of the above cited anode material of this invention.

Also, it is preferred that the carboxylic metal salt is a water-soluble carboxylic metal salt selected from the group consisting of formic metal salt, acetic metal salt, and propionic metal salt.

It is more preferred that the acetic metal salt is thermally stable and water-soluble.

One example is $(C_nH_{2n+1}COO)_mM$, wherein n is 0 to 2 as composite ratio, m is 1 to 4, and M is an element selected from the group consisting of Sn, Ag, Fe, Pd, Pb, Al, Si, In, Ni, Cu, Co, Zn, Cd.

Particularly, the preferable carboxylic metal salt is $(CH_3COO)_2Sn$.

In this example the invention is characterized in that the metal compound is at least either $SnO_2$ or SnO, or both of them in the method for preparing of the above cited anode material for the lithium secondary battery.

Also, it is preferred that the heat-treatment temperature is 250° C. to 800° C. when using a carboxylic metal salt and tin in the method of preparing of the anode material for the lithium secondary battery.

Also, the heat-treatment process is performed under non-active gas atmosphere or vacuum atmosphere.

Let it be explained that the lithium secondary battery of practical form of this invention with reference to the figure.

But, this invention is not restricted to the form represented in the following figure.

FIG. 1 represents a lithium secondary battery 1, in one practical form of this invention. The lithium secondary battery 1 of this invention is a cylindrical type, which consists of an anode electrode 2 (electrode) of the sheet type, a cathode electrode 3 of the sheet type, a separator 4 arranged between the cathode electrode 3, and the anode electrode 2, an electrolyte impregnated in the separator 4, a battery case 5 of the cylindrical type, and a sealing material sealing the battery case 5.

The lithium secondary battery 1 further consists of accepting in the battery case 5 a spiral type wound super positing anode electrode 2, a cathode electrode 3 and a separator 4.

The anode electrode 2 (electrode) related to this invention is coated by a capacitor such that the anode material slurry comprising the anode material is coated by a copper film.

The anode material slurry comprises anode material, a conductor such as graphite, and a binder such as polyfluorovinyllidene for binding the anode material and the conductor.

The anode material of this invention is an amorphous metal compound consisting of a metal capable of alloying lithium, which is coated on at least one part of a carbon material capable of absorbing and releasing lithium ion.

Particularly, it is preferred that the thin film of metal compound is coated on at least one part of the surface of the carbon material.

The carbon material may be made of any material capable of absorbing and releasing lithium ion reversibly, or a mixture of one or more of natural graphite powder, artificial graphite powder and amorphous carbon.

Also, it is preferred that the average diameter of the carbon material is 6 $\mu$m to 40 $\mu$m, and it is more preferred that the diameter is 8 $\mu$m to 25 $\mu$m.

The metal compound is one or more metal(s) selected from the group consisting of Sn, Ag, Fe, Pd, Pb, Al, Si, In, Cu, Co, Zn, Cd, capable of alloying with lithium. Particularly, it is preferred that the metal compound is a tin compound, and it is more preferred that the metal compound comprises either $SnO_2$ or SnO, or both of them.

An $SnO_2$ and/or SnO tin compound comprise(s) Sn easily capable of forming an alloy with lithium, and have(s) higher charge/discharge capacity than carbon material.

The single use of this tin compound can form an anode material having high charge/discharge capacity, but if this tin compound is coated with carbon material, an anode material having the merits of both the tin compound and the carbon material can be formed.

That is to say, on gaining a high charge/discharge capacity by the use of tin compound, the excellent properties of high charge/discharge efficiency, high cycle property and flat discharge curve of the carbon material can be achieved.

This tin compound (metal compound) is formed by heat-treatment of a carboxylic metal salt, particularly, it is preferred that the tin compound can be formed from a water-soluble carboxylic metal salt such as formic metal salt, acetic metal salt, and propionic metal salt. It is more preferred that the tin compound can be formed from $(CH_3COO)_2Sn$ (tin acetate).

The amorphous metal compound can be formed by heat-treatment of such a carboxylic metal salt.

In the case that the metal compound is (are) SnO and/or $SnO_2$, in regard to the weight ratio of the metal compound and the carbon material in the anode material, the content of metal compound in the anode material is preferable less than 30 weight %, and more preferable 5 weight % to 20 weight %.

It is not preferred that the content of metal compound (tin compound; $SnO_2$ and/or SnO) is more than 30 weight % because in such a case the charge-discharge property of the anode material is debased.

The cathode electrode is a cathode material slurry comprising a cathode material coated on a capacitor such as an Al film.

The cathode material slurry is formed from a cathode material of the cathode active material, a conductor such as graphite, and a binder such as polyfluorovinyllidene, which binds the cathode material and conductor.

The cathode active material exemplifies a compound such as $LiMn_2O_4$, $LiCoO_2$, $LiNiO_2$, $LiFeO_2$, $V_2O_5$, TiS, MoS, capable of absorbing and releasing lithium ion.

Also, an olefinic porous film such as polyethylene or polypropylene can be used as the separator 4.

A mixture solvating one or more electrolyte(s) of lithium salt(s) selected from the group consisting of $LiPF_6$, $LiBF_4$, $LiSbF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)C_yF_{2y+1}SO)$ (wherein, x, y are natural numbers), LiCl, LiF in one or more aprotic solvent(s) selected from the group consisting of propylenecarbonate, ethylenecarbonate, butylenecarbonate, benzonitrile, acetonitrile, tetrahydrofuran, 2-methyltetrahydrofuran, y-butyrolactone, dioxolane, 4-methyldioxolane, N,N-dimethylformamide, dimethylacetamide, dimethylsulfoxide, dioxane, 1,2-dimethoxethane, sulfolane, dichloroethane, chlorobenzen, nitrobenzene, dimethylcarbonate, methylethylcarbonate, diethylcarbonate, methylpropylcarbonate, methylisopropylcarbonate, ethylbutylcarbonate, dipropylcarbonate, diisopropylcarbonate, dibutylcarbonate, diethyleneglycol, dimethylether, can be used.

Also, the solid type of polymeric electrolyte can be used in place of the electrolyte solution, and it is preferred that a polymer can be used, and, for example, polyethyleneoxide, polypropyleneoxide, polyethyleneimine can be used. Also, the gel type of adding the electrolyte and solvent on this polymer can be used.

Next, the method of forming the anode material of this invention will be explained.

The method of forming the anode material of this invention comprises the steps of attaching the carboxylic metal salt on the carbon material by mixing the carboxylic metal salt with the carbon material, and forming one part of the carbon material coated with the metal compound by transforming the carboxylic metal salt into the amorphous metal compound.

Particularly, it is preferred that the carboxylic metal salt is coated on the carbon material by drying the carbon material attaching the carboxylic solution, and then heat-treating the carbon material.

The carboxylic metal salt used in this method is one or more metal(s) selected from the group consisting of Sn, Ag, Fe, Pd, Pb, Al, Si, In, Ni, Cu, Co, Zn, Cd, capable of alloying with lithium. Particularly, it is preferred that the carboxylic metal salt is a water-soluble carboxylic metal salt such as formic metal salt, acetic metal salt, and propionic metal salt. It is more preferred that the carboxylic metal salt is water-solubility stable thermally among the carboxylic metal salt.

In a preferred example the carboxylic metal salt represents as chemical formulae of $(C_nH_{2n+1}COO)_mM$. Where n of the chemical formulae is 0 to 2, m is 1 to 4, and M is one or more element(s) selected from the group consisting of Sn, Ag, Pd, Pb, Al, Si, In, Ni, Cu, Co, Zn, Cd.

It is preferred that the carboxylic metal salt is tin acetate.

Also, it is preferred that the carbon material is capable of reversibly absorbing and releasing lithium ion, such as, one or more material(s) of natural graphite powder, artificial graphite powder, amorphous carbon.

The method of precipitating the carboxylic metal salt on the surface of the carbon material by inputting the carbon material in the carboxylic metal salt and drying the solution is an example of attachment-means of the carboxylic metal salt on the carbon material.

The method of precipitating the carboxylic metal salt on the surface of the carbon material by spraying a solution of the carboxylic metal salt on the carbon material and simultaneously drying the solution is another example of attachment-means of the carboxylic metal salt on the carbon material.

Particularly, the metal compound can be made into a thin-film using these methods, and the lithium for the carbon material can be absorbed and released because it is easy for lithium ion to penetrate the metal compound in case of a charge-discharge reaction.

In the case where tin acetate is used as the carboxylic metal salt, it is preferred that the weight % of tin acetate to carbon material is less than 50 weight %, and it is more preferred that the weight % of tin acetate to carbon material is 10 weight % to 40 weight %.

If the content of tin acetate is more than 50 weight %, the charge-discharge efficiency and cycle property are debased because the contents of tin compound in the anode material is excessive.

Next, the metal compound is prepared by heat-treating carbon material coated with carboxylic metal salt, and thermolyzing the carboxylic metal salt. In case of using tin acetate as the carboxylic metal salt, a tin compound comprising $SnO_2$ and SnO is formed as the metal compound.

In case of using tin acetate as the carboxylic metal salt, it is preferred that heat-treatment temperature is 250° C. to 800° C., it is more preferred that the temperature is 300° C. to 500° C.

If the heat-treatment temperature is less than 250° C., the tin compound of the perfectly thermolyzed tin acetate cannot be formed; and if the heat-treatment temperature is more than 800° C., the carbon material can not comprise amorphous $SnO_2$ and SnO.

That is to say, the heat-treatment temperature in case of using a carboxylic metal salt, except for tin acetate, is determined for that carboxylic metal salt.

Also, it is preferred that the heat-treatment is performed under a nonreactive atmosphere or vacuum atmosphere.

By following these conditions, the anode material is formed if a tin compound comprising amorphous $SnO_2$ and SnO is coated on the surface of the carbon material.

The anode material having all the merits of tin compound and the carbon material is formed because the tin compound comprising amorphous $SnO_2$ and SnO is coated on the surface of the carbon material.

That is to say, the excellent properties of the lithium secondary battery is gained because the lithium secondary battery simultaneously has high charge-discharge efficiency, high cycle property and flat discharge curve by the carbon material and high charge-discharge capacity is gained by the use of the tin compound.

Also, the carboxylic metal salt can be attached on the surface of the carbon material and the anode material having uniform composition can be prepared because the water-soluble carboxylic metal salt is used and the solution of the carboxylic metal salt is attached on the surface of the carbon material in the method of the anode material for lithium secondary battery.

EXAMPLE 1

A Preparation of Anode Material

Tin acetate solution was prepared by dissolving tin acetate 1 g in pure water 15 g. Next, this tin acetate solution was added to 10 g of natural graphite having an average diameter of 18 μm and then the mixture was blended, and the tin acetate was attached on the surface of the natural graphite for 4 hours at 60° C.

And then, the tin acetate is thermolyzed by heat-treating the graphite for 8 hours at 350° C. under a nitrogen atmosphere after said process.

EXAMPLE 2

A Preparation of Anode Material

Tin acetate solution was prepared by dissolving tin acetate 50 g in pure water 300 g. And then, 250 g of natural graphite having an average diameter of 18 μm were inputted in an assembly container having an impeller of a jetmill electric motion flow-layer assembly device, tin acetate was attached on the surface of the natural graphite by rotating and agitating the natural graphite with 500 rpm of impeller insufflating the tin acetate solution in the natural graphite.

Next, after drying the graphite, the graphite was heat-treated for 8 hours at 400° C. under vacuum atmosphere and tin acetate was thermolyzed. The anode material of Example 2 was prepared.

Anode Material of Comparative example 1

Natural graphite having an average diameter of 18 μm was used as the anode of Comparative example 1.

Preparation of Test Cell for Charge-Discharge

Polyfluorovinyllidene was mixed with the anode material of Example 1, Example 2, and Comparative example 1, and the slurry solution was prepared by adding N-methylpyrrollidone to the mixture.

This slurry solution was coated on a copper film of 18 μm by a doctor blade method, and N-methylpyrrollidone was volatilized by drying it for 24 hours at 100° C. under vacuum atmosphere. By following this procedure, the anode material was laminated on a copper film of 120 μm. That is to say, the content of polyfluorovinyllidene of anode material slurry was 10 weight %.

And then, the anode electrode was prepared by laminating the anode material and boring the copper in a circle with a diameter of 13 mm.

The anode electrode was used as the active electrode, the lithium metal film having a bore in a circle was used as the counter electrode, the separator formed from a porous polypropylene film between the active electrode and the counter electrode was inserted, and the test cell of the coin type using the electrolyte dissolving $LiPF_6$(1 mole/L) in a mixture solution of propylenecarbonate(PC), diethylcarbonate(DEC), and ethylenecarbonate(EC) (PC:DEC:EC=1:1:1) was prepared.

The charge-discharge test was then performed at 0.2 C of charge-discharge current density, 0 V(Li/Li$^+$) of charge end voltage, and 2.0 V(Li/Li$^+$) of discharge end voltage.

Figure 2:
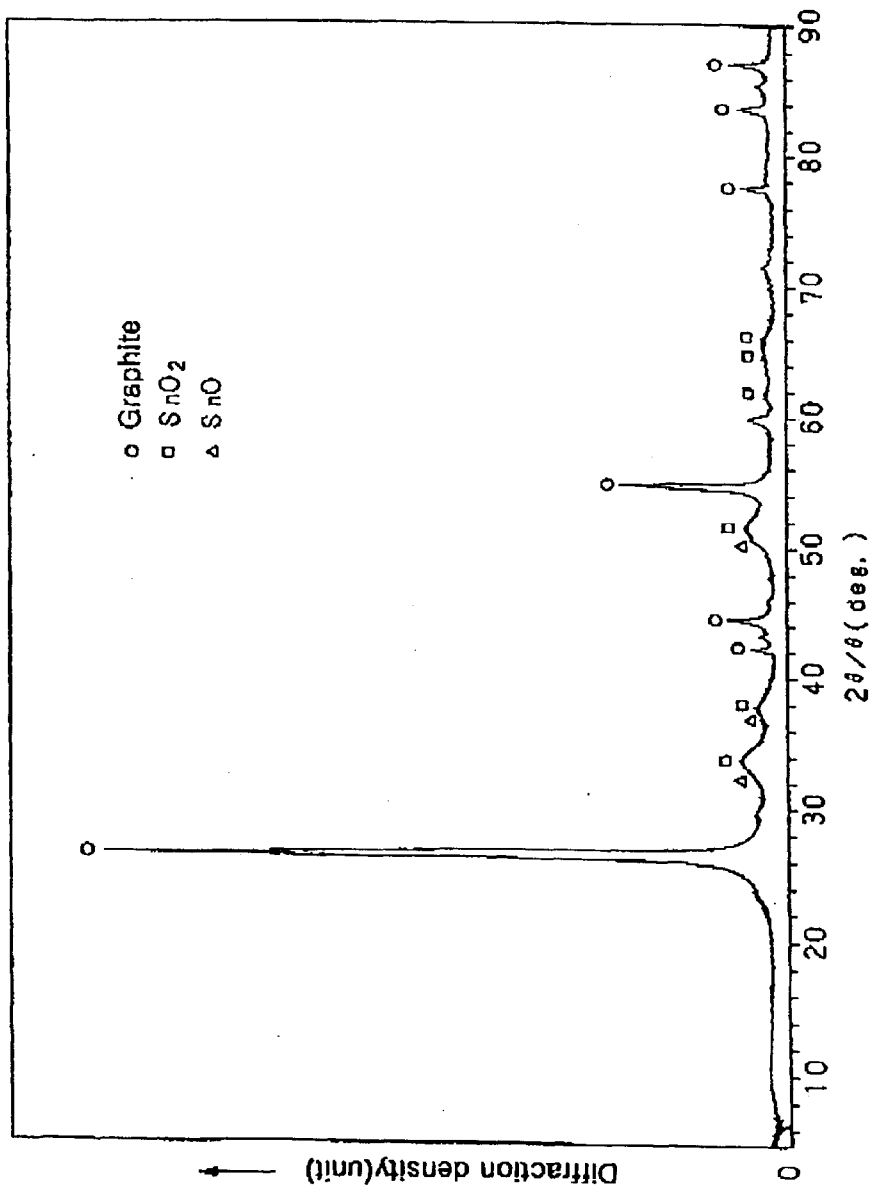
FIG. 2 is a drawing representing the result of X-ray diffraction test of the anode material of Example 1.
Figure 3:
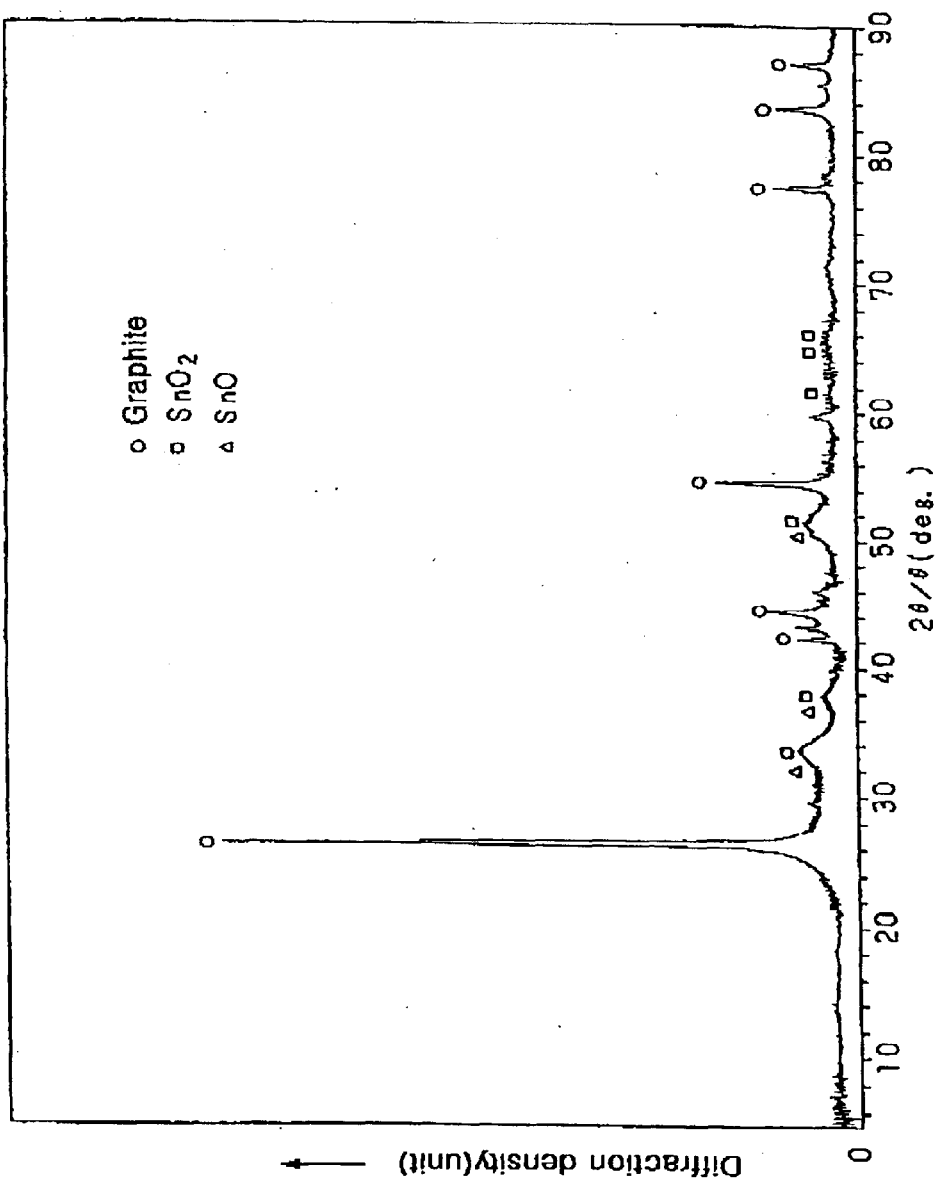
FIG. 3 is a drawing representing the result of X-ray diffraction test of the anode material of Example 2.
Figure 4:
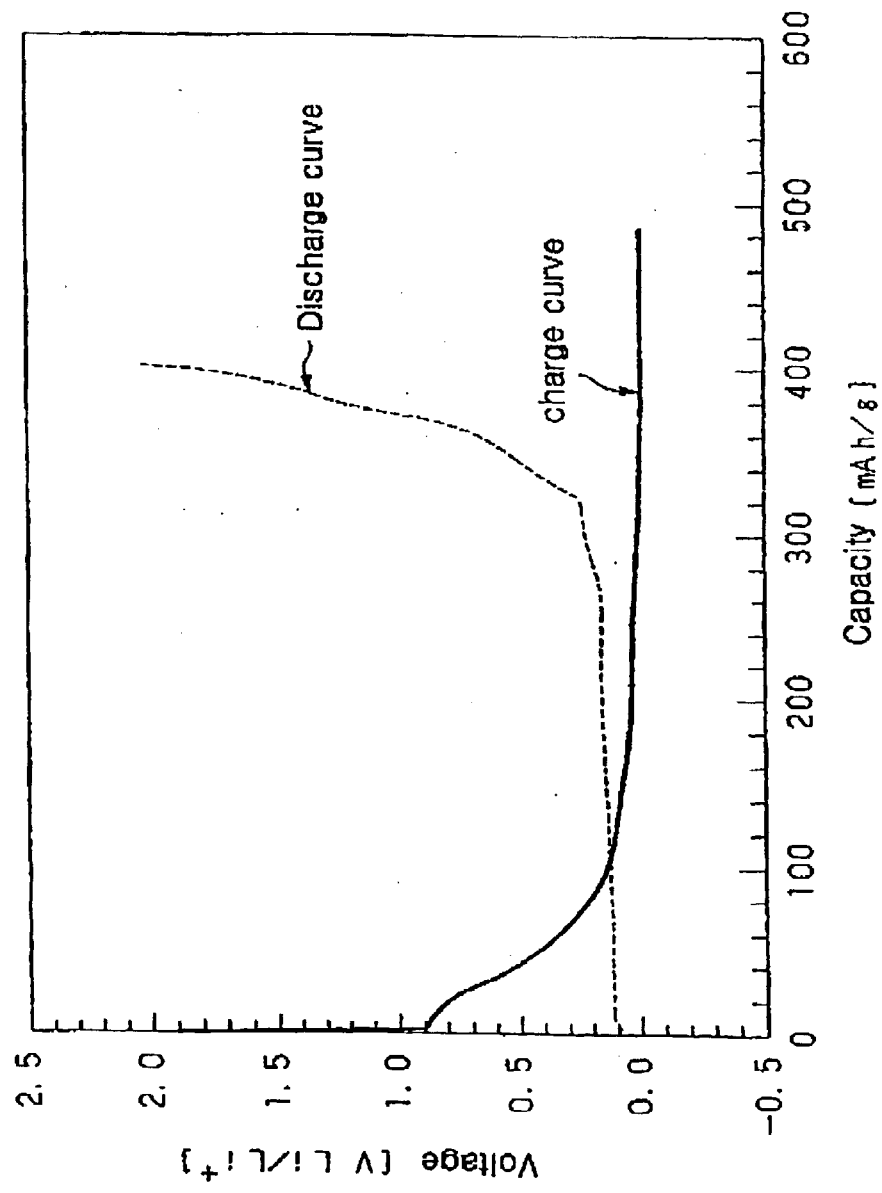
FIG. 4 is a graph representing the result of a 1 cycle charge discharge test of a test cell using an anode material of Example 1.
Figure 5:
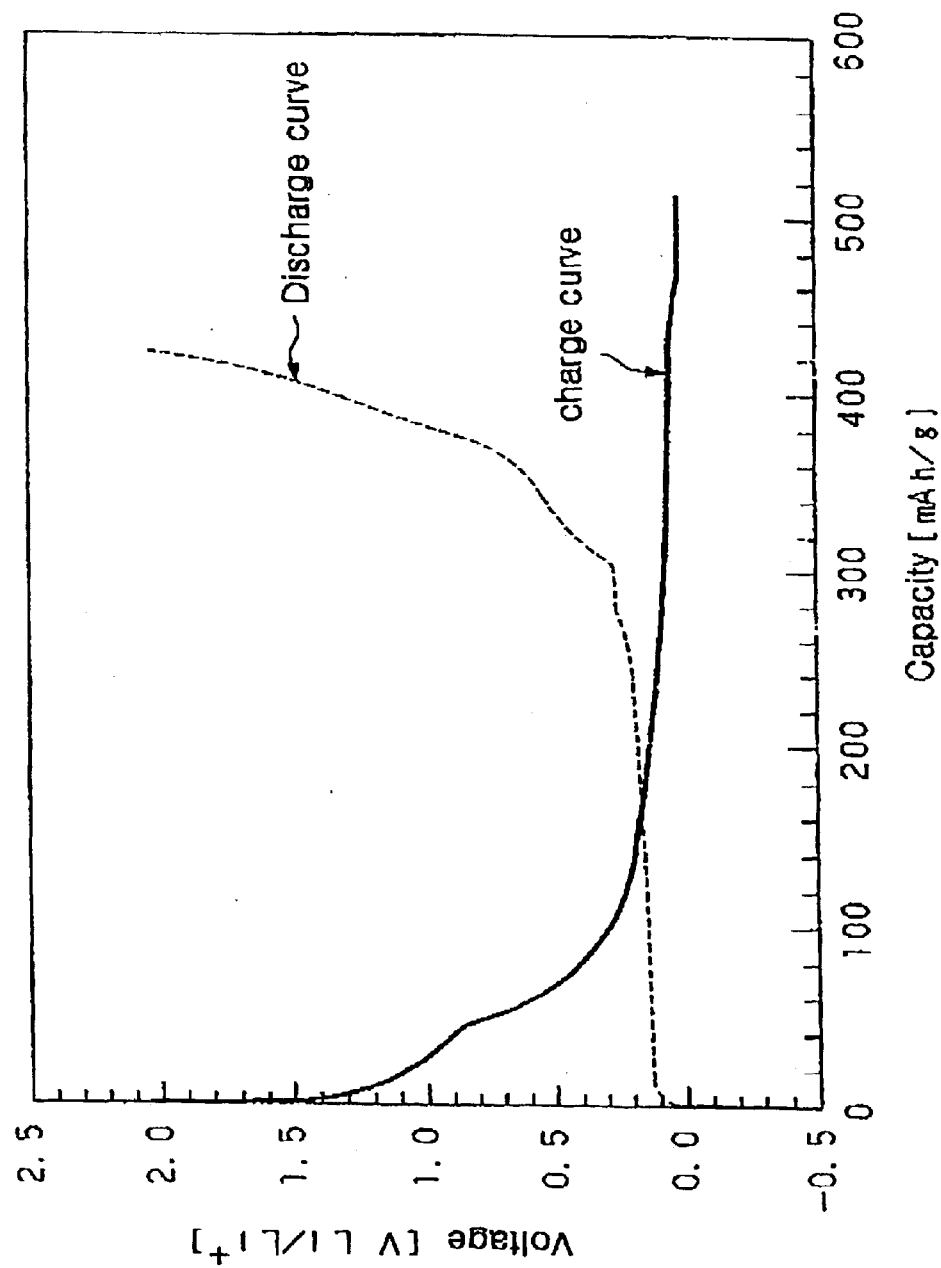
FIG. 5 is a graph representing the result of a 1 cycle charge-discharge test of a test cell using an anode material of Example 2.
Figure 6:
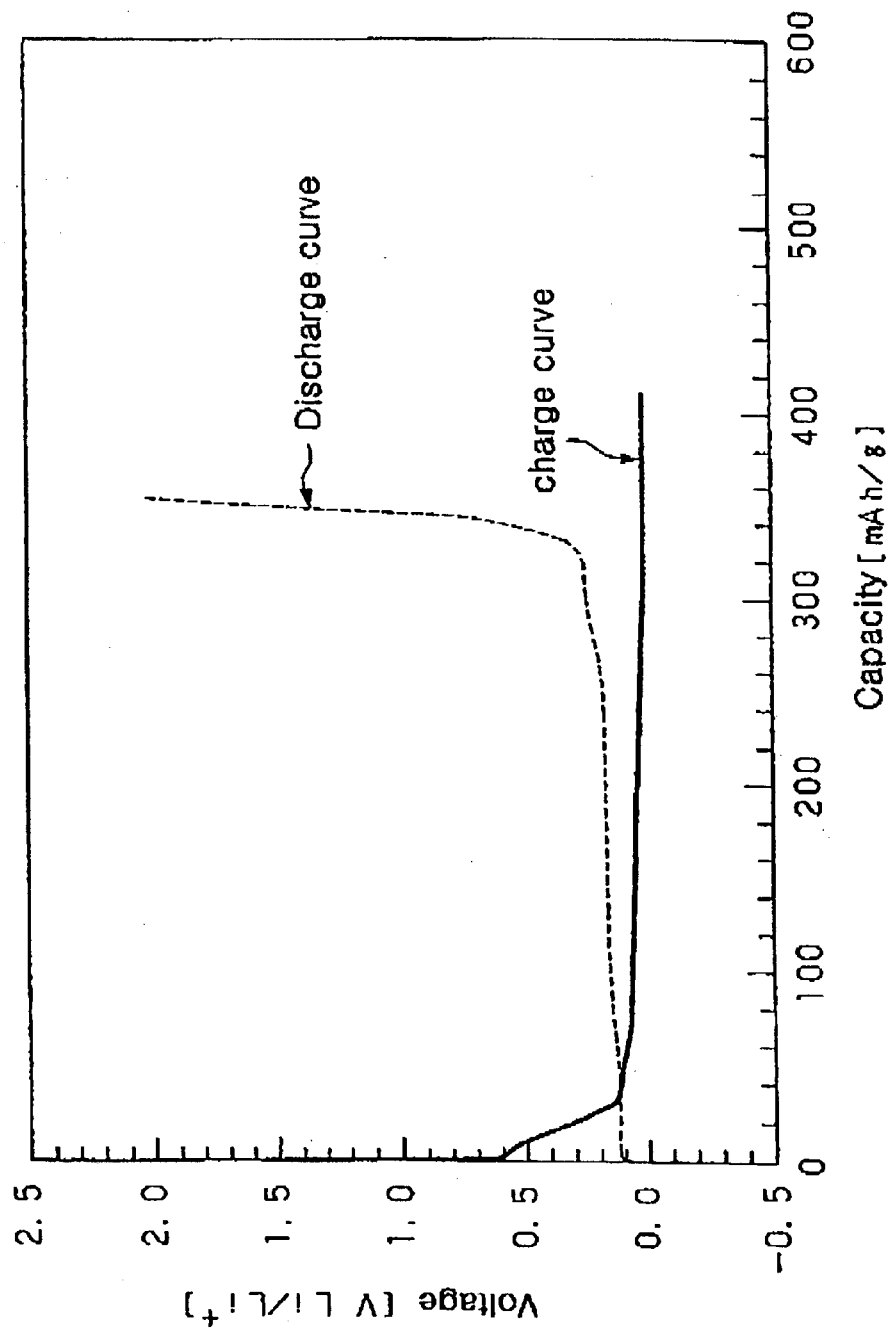
FIG. 6 is a graph representing the result of a 1 cycle charge-discharge test of a test cell using an anode material of Comparative Example 1.

FIG. 2 represents the result of X-ray diffraction of the anode material of Example 1, and FIG. 3 represents the result of X-ray diffraction of the anode material of Example 2. FIG. 4 represents the result of a charge-discharge test of 1 cycle of a test cell using the anode material of Example 1, and FIG. 5 represents the result of a charge-discharge test of 1 cycle of a test cell using the anode material of Example 2. FIG. 6 represents the result of a charge-discharge test of 1 cycle of a test cell using the anode material of Comparative example 1. Also, table 1 represents a charge-discharge capacity and a charge-discharge efficiency of 1 cycle of each anode material.

The Test of Physical Property of Anode Material

Related to FIG. 2 and FIG. 3, the diffraction peak of $SnO_2$ and SnO, except for the diffraction peak of graphite in the anode material of Example 1 and Example 2, can be confirmed. And, it can be confirmed that the diffraction peak of $SnO_2$ and SnO is broad and $SnO_2$ and SnO are amorphous.

The energy peak of Sn was confirmed on performing the element analysis by X-ray analysis of an energy disperse type.

It is alleged that the anode material of Example 1 and 2 consists of carbon material coated with amorphous $SnO_2$ and SnO.

The Result of Charge-Discharge Test

Also, as represented in table 1, it can be seen that the charge and discharge capacity of the anode material of Example 1 and 2 is higher than that of Comparative example 1. Particularly, it can be seen that the discharge capacity of the anode of Example 2 is very high because the capacity is 426 mAh/g.

Also, it can be seen that the charge-discharge efficiency of Example 1 and 2 is less than that of Comparative example 1, but both of them are not different. It is alleged that a drop of charge-discharge efficiency is a constraint because the content of tin compound of the anode material is proper because the content of tin compound is under 50 weight %.

TABLE 1

|  | Charge capacity (mAh/G) | Discharge capacity (mAh/g) | Charge-discharge efficiency (%) |
| --- | --- | --- | --- |
| Example 1 | 487 | 404 | 83 |
| Example 2 | 517 | 426 | 83 |
| Comparative 1 | 415 | 356 | 86 |

Also, as compared with FIG. 4 to FIG. 6, the discharge curve of the anode material (FIG. 6) of Comparative Example 1 represents the steep change of voltage at the end of discharge, on the contrary, the discharge curve of the anode material (FIG. 4, FIG. 5) of Example 1 and 2 comparatively represent the gentle change of voltage at the end of the discharge.

It is known that the voltage change is gentle when lithium occluded in $SnO_2$ and SnO reacts and is released. Thus, it is thought that the release reaction of lithium occluded in $SnO_2$ and SnO can occur at the end of the discharge of the anode material of Example 1 and 2.

The leftover discharge capacity is recognized from the comparative anterior step by sequentially detecting the change of voltage, because the voltage change of the anode material of the above Example 1 and 2 is comparatively gentle. Accordingly, the special effect that graphite material can be used as the anode material, can be achieved.

As explained above, because the anode material for the lithium secondary battery of the invention is coated with an amorphous metal formed by metal capable of alloying with lithium metal on at least one part of the surface of the carbon material, the lithium battery of the invention can have both of the merits of the carbon material having excellent cycle property and flat discharge curve, and the merits of the amorphous metal compound having high charge-discharge capacity.

Also, the movement of lithium ion is not interrupted by the metal compound because the carbon material is coated with a thin film of metal compound and lithium ion penetrates the thin film of metal compound during the charge-discharge process, and the lithium ion for the carbon material can be easily absorbed or released.

The charge-discharge capacity of the anode material can be enlarged because the metal compound comprises one or more metal(s) selected from the group consisting of Sn, Ag, Fe, Pd, Pb, Al, Si, In, Ni, Cu, Co, Zn, Cd, capable of alloying with lithium.

Moreover, the amorphous metal compound can be formed and the charge-discharge capacity of the anode material can be enlarged because the metal compound is formed by heat-treating a carboxylic metal salt.

Also, it is possible for the charge-discharge capacity of the anode material to become high because the metal compound comprises $SnO_2$ and/or SnO having very high charge-discharge capacity.

Moreover, because the lithium secondary battery of this invention has the lithium ion occluded in $SnO_2$ and SnO, at the end of the discharge the anode material mainly performs a release-reaction and the voltage change is comparatively gentle at the end of discharge, accordingly the leftover of discharge capacity is detected from the comparative anterior step by detecting the voltage change sequentially.

Accordingly, the special effect that graphite material can be used as the anode material, can be achieved.

According to the method for preparing the anode material for the lithium secondary battery of the invention, because the method uses water-soluble carboxylic metal salt and the solution of carboxylic metal salt is attached on the surface of the carbon material, carboxylic metal salt can be uniformly attached on the surface of the carbon material and the anode material having the uniform composition can be prepared.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for making an anode material for a lithium secondary battery comprising:
    attaching a carboxylic metal salt on a carbon material by combining the carboxylic metal salt with the carbon material; and
    converting the carboxylic metal salt into an amorphous metal compound to form a carbon
    forming a metal compound on the carbon material by transforming the carboxylic metal salt into an amorphous metal compound.

2. The method according to claim 1, wherein the step of attaching is performed by contacting the carboxylic metal salt with the carbon material to form a coated carbon material and drying the coated carbon material.

3. The method according to claim 1, wherein the carboxylic metal salt comprises one or more metals selected from the group consisting of Sn, Ag, Fe, Pd, Pb, Al, Si, In, Ni, Cu, Co, Zn, and Cd.

4. The method according to claim 1, wherein the carboxylic metal salt is tin acetate.

5. The method according to claim 1, wherein the metal compound comprises at least one of $SnO_2$ and SnO.

6. The method according to claim 1, wherein the carboxylic metal salt is converted into the amorphous metal compound by heat-treating the carboxylic metal salt attached to the carbon material.

7. The method according to claim 6, wherein the heat-treating is performed at a temperature ranging from about 250° C. to about 800° C.

* * * * *